United States Patent
Binot

(10) Patent No.: US 6,966,993 B2
(45) Date of Patent: Nov. 22, 2005

(54) METHOD AND PLANT FOR THICKENING SLUDGE DERIVED FROM WATER TREATMENT BY FLOCCULATION-DECANTATION WITH BALLASTED FLOC

(75) Inventor: Patrick Binot, Rentilly par Bussy (FR)

(73) Assignee: OTV S.A., (FR)

( * ) Notice: Subject to any disclaimer, the term of this patent is extended or adjusted under 35 U.S.C. 154(b) by 99 days.

(21) Appl. No.: 10/470,934

(22) PCT Filed: Feb. 8, 2002

(86) PCT No.: PCT/FR02/00501

§ 371 (c)(1),
(2), (4) Date: Aug. 1, 2003

(87) PCT Pub. No.: WO02/064512

PCT Pub. Date: Aug. 22, 2002

(65) Prior Publication Data

US 2004/0055961 A1 Mar. 25, 2004

(30) Foreign Application Priority Data

Feb. 9, 2001 (FR) .................................. 01 01832

(51) Int. Cl.⁷ .......................................... C02F 11/14
(52) U.S. Cl. ................ 210/711; 210/713; 210/714; 210/715; 210/718; 210/727
(58) Field of Search .......................... 210/609, 710, 210/711, 713, 714, 724, 725, 727, 718, 738, 210/188, 195.1, 195.3, 709, 712, 715

(56) References Cited

U.S. PATENT DOCUMENTS

| | | | |
|---|---|---|---|
| 3,977,966 A | | 8/1976 | Pradt et al. ................. 210/761 |
| 4,927,543 A | * | 5/1990 | Bablon et al. .............. 210/711 |
| 5,000,853 A | * | 3/1991 | Reischl et al. .............. 210/616 |
| 5,192,441 A | | 3/1993 | Sibony et al. .............. 210/603 |
| 5,641,401 A | * | 6/1997 | Stultz et al. ................. 210/218 |
| 5,770,091 A | * | 6/1998 | Binot et al. ................. 210/711 |
| 6,224,772 B1 | * | 5/2001 | Golcz ......................... 210/626 |
| 6,383,370 B1 | * | 5/2002 | Keever et al. .............. 210/96.1 |
| 6,485,652 B1 | * | 11/2002 | Le Poder et al. ........... 210/713 |
| 6,824,692 B2 | * | 11/2004 | Binot et al. ................. 210/709 |

FOREIGN PATENT DOCUMENTS

FR    2 785 899    5/2000

* cited by examiner

Primary Examiner—Peter A. Hruskoci
(74) Attorney, Agent, or Firm—Coats & Bennett, P.L.L.C.

(57) ABSTRACT

A method is provided for thickening sludge produced through a ballasted flocculation process. The sludge and granular material from the ballasted flocculation process are directed to a sludge separator where the sludge is separated from the granular material. Thereafter the separated sludge is sent to a degassing area and the sludge is degassed. A flocculating agent is mixed or injected into the sludge. The sludge is directed to a sludge thickener with a load at a sill calculated on the surface of the thickener greater than 200 kgMIS/m²/day. This process produces a thickened sludge having a concentration greater than 10 gm/l.

14 Claims, 1 Drawing Sheet

Figure 1:
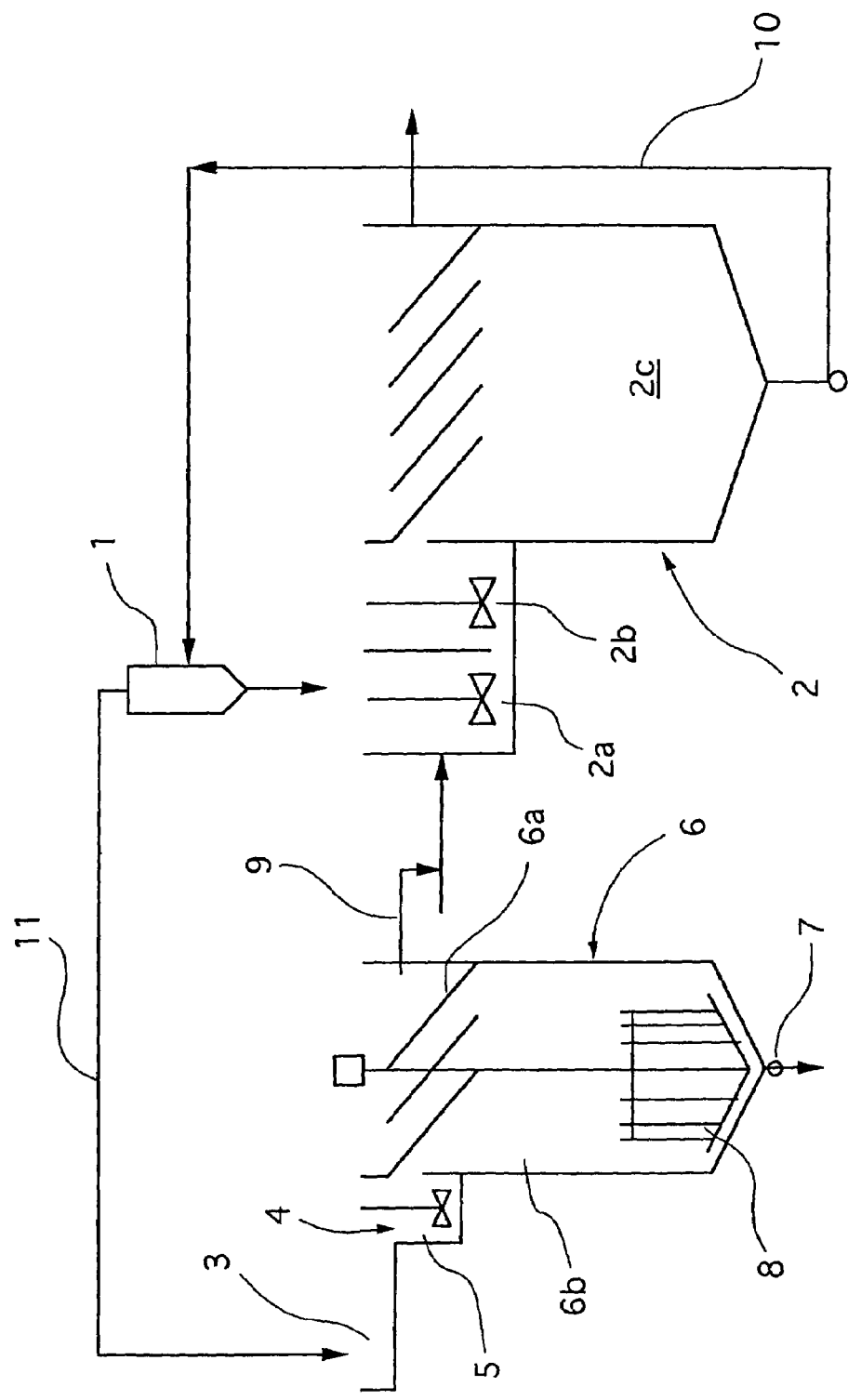

METHOD AND PLANT FOR THICKENING SLUDGE DERIVED FROM WATER TREATMENT BY FLOCCULATION-DECANTATION WITH BALLASTED FLOC

This application is a U.S. National Stage application of PCT Application No. PCT/FR02/00501, with an international filing date of Feb. 8, 2002. Applicant claims priority based on French application serial no. 01 01832 filed Feb. 8, 2001.

The invention relates to the field of treatment of sludge derived from water treatment methods.

More precisely, the invention relates to the field of the treatment of sludge derived from plants for treating water by flocculation-decantation with floc ballasted by micro-sand or by an equivalent material.

In water treatment plants, the sludge extracted from settlers separating the substances able to be settled from the water to be treated may have been thickened at the bottom of the sludge settler, up to concentrations of dry matter exceeding 15 grams per liter, and able to reach more than 100 grams per liter. These thickening settlers often comprise a recirculation loop for the sludge, recirculating part of the sludge extracted from the bottom of the settler to the flocculation zone.

This technique has the disadvantage of keeping the sludge in the bottom of the settler for a long time period, which may result in the phenomena of fermentation and of salting out pollution in the sludge settler.

Therefore specific structures are often provided for thickening the sludge, to which the settled sludge is directed to thicken, and which alter the concentration of this sludge, which is often below 10 or 5 grams per liter, to a concentration higher than 15 or even 50 grams and up to more than 100 grams per liter.

These thickening structures, called thickeners hereinafter, are like settling basins in which the sludge to be thickened is introduced, while the sludge thickened by the effect of gravity, often with the aid of a turning rake facilitating the separation of flocs during settling from the water capturing them, is extracted from the bottom of the thickener. The water freed from the thickened sludge is recuperated by overflow, in the upper part of the thickener.

These thickeners can take the form of single element settlers or, more rarely, plate settlers. Their dimensions are adjusted by those skilled in the art, for loads at the sill (division of the daily load of matter in suspension (MIS) to be thickened, expressed in kilograms of matter in suspension per day, by the surface area of the base of the thickener, usually called the sill surface) not exceeding 120 kgMIS/$m^2$/day, except in cases of very specific sludge such as sludge after carbonate removal, very charged in mineral particles. Thus the Memento Technique de L'Eau (ninth edition, volume 2 page 921) describes mass flows of from 80 to 120 kgMIS/$m^2$/day for fresh primary sludge, of from 45 to 70 kgMIS/$m^2$/day for primary sludge+fresh activated sludge, and of from 15 to 25 kgMIS/$m^2$/day for Drinking Water flocculation sludge with metallic hydroxides (without silt)

In the case of physico-chemical settling flocculation ballasted with granular matter, especially those described in patents FR 2627704 and FR 2739094 by the Applicant, the settlers are calculated on the base of very high settling speeds (division of the flow rate of treated water in $m^3$/hr by the surface area of "mirror" settling), able to reach up to 50 to 100, or even 200 m/hr, when treating water with MIS concentration able to reach 1, or even more than 2 gm MIS/liter: a simple calculation shows that such settling basins, producing per $m^2$ 100 kg/MIS/hr and per $m^2$ surface area of mirror settling when treating waters with concentration 1 gm/l at 100 m/hr, will require a sill surface of thickness of at least 24 $m^2$ per $m^2$ of mirror settling surface, when the thickness is dimensioned in the traditional way on the basis of 100 kgMIS/$m^2$sill/day maximum.

Such thickening surfaces are generally not very compatible with the compactness sought when using rapid settling basins with ballasted floc of micro-sand.

The aim of the present invention is to solve these problems.

This aim is achieved by means of the invention which relates to a method for thickening sludge issued from at least one water treatment unit by flocculation decantation with floc ballasted with micro-sand or other dense granular material, implementing a hydrocycloning stage of the settled sludge, characterised in that it comprises successive stages consisting of:
- a degassing stage for the overflow sludge from the hydrocycloning of the ballasted flocculation decantation unit, said degassing stage being implemented over a degassing surface corresponding to a superficial degassing speed of less than 100 m/hr.
- an injection stage of at least one flocculation agent in said sludge;
- a thickening stage of said sludge in at least one lamellar thickener, with a load at the sill calculated on the sill surface of the thickener greater than 200 kgMIS/$m^2$/day and the concentration of extracted sludge greater than 10 gm/l.

In fact, the Applicant noted that the sludge issued from water treatment by flocculation decantation with ballasted floc of granular ballast, such as micro-sand has, as long as there is degassing at the overflow outlet from the hydrocyclone separating it from the recycled ballast material, and with prior reflocculation, an unexpected aptitude for rapid sludge thickening.

According to an advantageous variant, the method comprises a supplementary stage for injection of at least one coagulating agent upstream of the injection of flocculating agent. Such an addition makes it possible to obtain, if needed, improvement in the quality of the overflows.

Preferably, said degassing stage is implemented over a degassing surface corresponding to a superficial degassing speed less than 60 m/hr.

Preferably also, said injection stage of flocculating agent is carried out within an agitated flocculation zone with a stay time of 10 minutes or less, and preferably 4 to 6 minutes, the surface of the flocculation zone being able to constitute all or part of the degassing zone.

According to an advantageous embodiment of the invention, said thickening stage is carried out in a lamellar thickener in which the under-blade free height is comprised between 2 and 4 meters, the method comprising a control stage of the height of the sludge blanket enabling it to be maintained between two pre-defined heights, each of these heights being at least 1.5 meters.

When said sludge is issued from tertiary sewage treatment, said thickening stage is preferably carried out with a load at the sill greater than 300 kgMIS/$m^2$/day for a concentration of extracted sludge of more than 15 gm/l.

When said sludge is issued from primary sewage treatment, or overflows of combined sewage from rain, said thickening stage is preferably carried out with a load at the sill greater than 1000 kgMIS/m²/day for a concentration of extracted sludge of more than 25 gm/l.

When the sludge to be thickened is issued from the settling treatment of surface water other than carbonate removal treatment, said thickening stage is preferably carried out with a load at the sill greater than 200 kgMIS/m²/day for a concentration of extracted sludge of more than 10 gm/l.

In practice, one can thus use thickeners of from 2 to more than 12.5 times more compact than traditional thickeners dimensioned at less than 120 kgMIS/m²/day, without this requiring (but without excluding) the presence of a recirculation loop for sludge between the bottom of the thickener and the flocculator.

Thus the invention makes it possible to thicken ballasted flocculation decantation sludge in very compact structures, up to concentrations which can exceed:
  20 gm/l for tertiary treatment sludge by ballasted flocculation of sewage treated biologically prior to ballasted flocculation,
  35 gm/l for sludge from treatment by ballasted flocculation of primary sewage, or overflows from storm sewers,
  from 10 to more than 100 gm/l for sludge issued from treatment by ballasted flocculation of water destined for drinking water, before filtration.

The concentrations given above require the maintenance (in the case of continuous or semi-continuous extraction of sludge from the bottom of the thickener), or the periodic raising (in the case of periodic extraction of sludge by opening the valve at the bottom of the thickener) of the sludge blanket up to a height of at least two meters.

It is to be noted that such loads at the sill impose, depending on the concentration of sludge to thicken and the sludge thickened, high speeds at the mirror (division of the overflow water flow rate of the thickener by the mirror surface area of the upper decantation zone). These high speeds at the mirror are accepted without abnormal losses of materials in suspension (MIS) in the overflow waters due to the interposition of decantation plates in the upper part of the thickener, in such a way as to maintain the Hazen speed (division of the overflow water flow rate from the thickener by the total surface projected by the plates on the horizontal plane) within limits compatible with the quality of overflow required.

According to a variant of the invention, the overflow waters from said thickening stage are returned to the head of said lamellar decantation plant with ballasted floc.

According to another variant of the invention, the method does not comprise a recirculation stage for sludge coming from said thickening stage to said injection stage of flocculating agent.

According to a further variant, the method comprises a recirculation stage for sludge coming from said thickening stage to said injection stage of flocculating agent.

The invention also relates to any lamellar thickening plant for sludge issued from at least one water treatment unit by flocculation decantation with floc ballasted with micro-sand or other dense granular material, characterised in that it presents: at least one degassing zone able to be produced in the form of one or several channels or tank with a minimum total surface area corresponding to a degassing speed of 100 m/hr relative to the entering sludge flow rate, means for injection of at least one flocculating agent and at least one thickening settler comprising a lamellar decantation zone, a thickening zone for sludge under plates, an extraction device for sludge and an extraction zone for clarified overflow water above the plates, the surface at the sill of said thickener being less than that obtained by dividing the flow of MIS to thicken expressed in kg MIS/day for a minimum admissible load of 200 kgMIS/m²/day.

Preferably, the invention also comprises means for injection of a coagulating agent provided upstream from said injection means for the flocculating agent.

According to an advantageous variant of the invention, the maximum total surface of said degassing zone corresponds to a degassing speed of 60 m/hr relative to the flow rate of entering sludge.

Advantageously, the plant according to the invention comprises at least one agitated flocculation tank, whose surface can be the whole of or part of the degassing zone.

Preferably, said thickener settler comprises plates of length of between 0.5 meters and 3 meters, typically 1.5 meters, with a spacing comprised between 5 and 15 cm, and preferably between 7.5 and 10 cm, with an angle formed relative to the horizontal greater than 55°, and preferably 60°, and in which the free height between sill and bottom of the plates is comprised of between 2 and 4 meters, said thickener settler comprising a sludge raking device and comprising sensors for monitoring the height of the sludge blanket thus making it possible to maintain the latter between two pre-defined heights, each being of at least 1.5 meters.

According to a variant, the plant according to the present invention has no recirculation loop for sludge between the lower part of said thickening zone and said flocculation zone.

According to another variant, the plant has a recirculation loop, constituted of piping and a sludge pump, recirculating part of the sludge between the lower part of said under-blade thickening zone and said flocculation zone.

The invention together with its various advantages will be better understood by reading the following description of a non-limiting embodiment mode of the invention provided with reference to FIG. 1, showing a plant such as this diagrammatically.

With reference to FIG. 1, a water treatment unit 2 for flocculation decantation with floc ballasted with micro-sand comprises, in the traditional way a coagulation zone 2a, a flocculation zone 2b and a lamellar settling zone 2c. The mixture of micro-sand and sludge extracted from the lamellar settling zone is carried by channel 10 to a hydrocycloning unit 1 where the micro-sand is separated from the remainder of the sludge. The micro-sand thus separated is re-injected into the water treatment unit 2 by flocculation decantation.

According to the invention, the sludge exiting from the hydrocycloning unit 1 is carried by a channel 11 or is degassed in a degassing zone 3 before being carried to a thickener 6 with a decantation plate zone including inclined plates 6a, a sludge thickening under-blade zone 6b, an extraction device 7 for sludge and an extraction zone for clarified overflow water 9 above the blades 6a.

This zone 3 can take on any form whatsoever making it possible to separate the sludge from the gases it has caught during hydrocycloning, such as a specific tank, or all or part of the channel carrying the hydrocycloned sludge to the thickener 6. In the embodiment shown in FIG. 1, this degassing zone 3 is in the form of a basin provided just upstream from the thickener 6.

The degassing zone 3 is dimensioned on the basis of a degassing surface area greater than the ratio of the flow rate of sludge to be thickened divided by a superficial speed of less than 100 m/hr, preferably of less than 60 m/hr and even more preferably of less than 30 m/hr.

After degassing, a polymer, generally anionic, is added to the sludge, at the level of from 0.5 to 5 gm/m$^3$ of sludge to thicken, and typically of from 1 to 3 gm/m$^3$.

This polymer injection 4 can be carried out on line, before injection in the thickener 6, but is preferably carried out, as shown in FIG. 1, in a slightly agitated flocculator 5, with a hydraulic stay time in the latter of the order of 10 minutes or less, and preferably of from 4 to 6 minutes. As flocculating agent, a polymer can be used, for example, at a level of 0.5 to 5 mg active material/liter of sludge to thicken.

The flocculated sludge is then introduced under the plates 6a of the thickener 6, or in the plates by their edge.

The plates 6a have a length comprised between 0.5 meters and 3 meters, and typically 1.5 meters, and have a spacing comprised between 5 and 15 cm, and preferably between 7.5 and 10 cm; their angle relative to the horizontal is greater than 55° and preferably equal to 60°; their setting is envisaged to ensure that the overflows have a Hazen speed lower than 10 m/hr, and typically of from 1 to 3 m/hr.

The sludge thickens in the lower part of the thickener 6, a sufficient free height (typically between 2 and 4 meters) being provided between the bottom of the plates and the sludge evacuation valve 7, to which the thickened sludge is carried by gravity alone, in the case of a pyramidal extraction hopper with steep slope, or by a scraper, in the case of a bottom with a small slope. Preferably, a rake 8 is installed to improve thickening.

The sludge is extracted either by maintaining the level of the sludge blanket between two pre-defined heights, under the control of a sludge level sensor, or by periodically opening the extraction valve, with or without monitoring the concentration of sludge extracted using a concentration sensor.

The water separated from the thickened sludge is recuperated by overflow 9 from the thickener 6, typically by spouts ensuring a good hydraulic spread of water extraction.

According to its quality, the overflow water can be mixed directly with the water treated by the flocculator-decanter with ballasted floc, or can be returned to the head of the treatment by ballasted flocculation decantation, as shown in FIG. 1.

As example, a lamellar thickener produced according to the basis of the principle above, with a degassing zone of superficial speed 60 m/hr, a pre-flocculation by direct injection of flocculent in the piping for sludge supply for the thickener under the plates, four plates at 60° relative to the horizontal, of width 1 m and length 1.5 meters, separated by 75 cm, an under-plate thickening zone of height 3 meters, of cylindrical-pyramid shape, the thickener bottom pyramidal hopper having sides inclined at 60° relative to the horizontal, without rake in the thickening zone, and with extraction under a height of 1.5 meters minimum, made it possible to obtain the following performance on ballasted decantation sludge for primary municipal sewage:

concentration of sludge to thicken: 2 gmMIS/l
concentration of thickened sludge: >30 gmMIS/l
load at the sill: 1000 to 1500 kgMIS/m$^2$sill/day
with concentration overflows: <300 mgMIS/l.

What is claimed is:

1. A method for thickening sludge produced by a ballasted flocculation water or wastewater treatment system comprising:
    a. directing a mixture of sludge and granular material from the ballasted flocculation water or wastewater treatment system to a sludge separator and separating the sludge from the granular material;
    b. directing the separated sludge to a degassing area and degassing the sludge;
    c. injecting a flocculation agent into the sludge; and
    d. directing the sludge to a sludge thickener with a load at a sill calculated on the sill surface of the thickener greater than 200 kgMIS/m$^2$/day, and producing a thickened sludge having a concentration greater than 10 gm/l.

2. The method of claim 1 wherein the degassing of the sludge is implemented over a degassing surface corresponding to a superficial degassing speed of less than 100 m/hr.

3. The method of claim 1 including injecting at least one coagulating agent into the sludge.

4. The method of claim 3 wherein the injection of the coagulating agent occurs upstream from the injection of the flocculating agent.

5. The method of claim 1 wherein the degassing of the sludge is implemented over a degassing surface corresponding to a superficial degassing speed lower than 60 m/hr.

6. The method of claim 1 wherein the flocculating agent is mixed with the sludge in an agitated flocculation zone.

7. The method of claim 6 wherein the residency time of the sludge within the agitated flocculation zone is 10 minutes or less.

8. The method of claim 1 wherein the sludge thickening is carried out in a lamellar thickener.

9. The method of claim 8 wherein a sludge blanket is formed in the sludge thickener and the sludge thickener includes a series of plates that are spaced approximately 2 to 4 meters above a bottom portion of the thickener, and wherein the height of the sludge blanket is monitored and maintained between two predetermined heights.

10. The method of claim 1 wherein the sludge is produced from tertiary sewage treatment and the thickening process is carried out with a load at the sill greater than 300 kgMIS/m$^2$/day and produces a concentration of thickened sludge greater than 15 gm/l.

11. The method of claim 1 wherein the sludge is produced from a primary sewage treatment or from combined sewage overflows resulting from rain, and wherein the thickening process is carried out with a load at the sill greater than 1000 kgMIS/m$^2$/day and produces a thickened sludge having a concentration greater than 25 gm/l.

12. The method of claim 1 wherein the sludge to be thickened is produced from the settling treatment of surface waters other than carbonate removal treatment, and wherein the thickening process is carried out with a load at the sill greater than 200 kgMIS/m$^2$/day and produces a sludge concentration of more than 10 gm/l.

13. The method of claim 1 including separating water from the thickened sludge and returning the separated water to the water or wastewater treatment system that produced the sludge.

14. The method of claim 1 wherein the flocculating agent is injected into the sludge in an area, and returning at least a portion of the thickened sludge from the sludge thickener to the area where the flocculating agent is injected into the sludge.

* * * * *